United States Patent [19]

Schnitzler

[11] Patent Number: 4,601,602
[45] Date of Patent: Jul. 22, 1986

[54] TIE ROD JOINT

[75] Inventor: Frank D. Schnitzler, Hilden, Fed. Rep. of Germany

[73] Assignee: TRW Ehrenreich GmbH & Co., KG, Fed. Rep. of Germany

[21] Appl. No.: 634,783

[22] Filed: Jul. 26, 1984

[30] Foreign Application Priority Data

Jul. 30, 1983 [DE] Fed. Rep. of Germany ....... 3327550

[51] Int. Cl.$^4$ .......................... F16C 11/06; B62D 5/06
[52] U.S. Cl. ...................................... 403/56; 403/141;
    403/224; 403/226; 403/372; 280/95 R; 280/673
[58] Field of Search ............... 403/224, 225, 226, 388,
    403/372, 367, 56, 141; 280/95 R, 96, 95 A, 673,
    674

[56] References Cited

U.S. PATENT DOCUMENTS

| | | |
|---|---|---|
| 1,829,306 | 10/1931 | Sneed . |
| 2,128,329 | 8/1938 | Schjolin .............. 280/96 |
| 2,232,667 | 2/1941 | Sawer .................. 403/224 |
| 2,246,833 | 6/1941 | Beemer ............... 280/95 R |
| 2,305,881 | 12/1942 | Leighton ............ 280/95 A |
| 3,441,299 | 4/1969 | Pfaar .................... 280/95 R |
| 4,062,637 | 12/1977 | Allison ................ 403/224 |
| 4,428,450 | 1/1984 | Stenstram et al. ..... 280/96 |

FOREIGN PATENT DOCUMENTS

| | | |
|---|---|---|
| 1121947 | 1/1962 | Fed. Rep. of Germany . |
| 1463358 | 2/1977 | United Kingdom . |
| 1551850 | 9/1979 | United Kingdom ........... 403/224 |

Primary Examiner—Cornelius J. Husar
Assistant Examiner—Peter M. Cuomo
Attorney, Agent, or Firm—Yount & Tarolli

[57] ABSTRACT

The subject of the invention is a tie rod joint for motor vehicles for the linking of the inner ends of two tie rods to a steering rod, actuated by a steering gear, the inner ends of the tie rods being shaped as formed joint parts, which project in each case between an outer and an inner bearing part, while between the joint parts and the outer bearing part on the one hand, and the inner bearing part on the other, inlays are arranged, and while the outer bearing part, the joint parts, the inlays and the inner bearing part are prestressed by at least one tension bolt fastened to the steering rod. To make possible the production, without cutting, of all construction parts of the tie rod joint, and to provide a spring joint movable to all sides, it is proposed that the tie rods (1, 2) be profiled in U-form and their joint parts be designed as offsets (6), the outer bearing part be designed as a pot-form outer bearing shell (9, 15), into which the offsets (6) project, the inner bearing part be designed as a socket-form inner bearing shell (10, 16), and the inlays (7, 8; 21, 22) be produced from a spring-elastic material.

10 Claims, 7 Drawing Figures

TIE ROD JOINT

The subject of the invention is a tie rod joint for motor vehicles, for the linking of the inner ends of two tie rods to a steering rod, actuated by a steering gear, the inner ends of the tie rods being designed as formed joint parts which in each case project between an outer and an inner bearing part, while between the joint parts and, on the one hand the outer, and on the other the inner bearing part, inlays are arranged and while the outer bearing part, the joint part, the inlays and the inner bearing part are prestressed by at least one tension bolt fastened to the steering rod.

From British Pat. No. 1,463,358 there is known a tie rod joint of this kind, in which the inner ends of the tie rods are designed as joint parts, and in each case project between an outer and an inner bearing part, while between the joint parts on the one hand, and between the outer and inner bearing parts on the other, interposed discs are arranged. In this known tie rod joint, the inner joints of the tie rods are designed as friction bearings, which cannot be produced by production methods whithout cutting, and are therefore expensive.

From U.S. Pat. No. 1,829,306, tie rod joints for motor vehicles have been described which consist of ball shells fastened to the tie rods, and ball bodies arranged movable therein, which are fastened to the steering levers. Here, the ball shells are designed as offsets from the tie rods. This known tie rod joint, also, cannot be produced by production methods without cutting, and is therefore expensive.

Finally, from German Published Application No. 1,121,947 is known still another tie rod joint, which is designed as a double ball joint, in which the inner ends of the tie rods are supported by ball shell sections (cut outs) against the ball head of a joint journal, and are held fast in this position by ball semi-shells into a joint housing. This known tie rod joint also cannot be produced by production methods without cutting, and is thus expensive.

Starting from this, the invention attacks the problem of providing a simply-constructed tie rod joint, of which the individual parts can be produced without cutting and, in the mounted condition, form a spring joint movable to all sides.

For the technical solution of this problem, a tie rod joint of this kind is proposed in which:

(a) the tie rods are profiled in U-shape and their joint parts designed as offsets,
(b) the outer bearing part is designed as a pot-form cup-shaped outer bearing shell into which the offsets project,
(c) the inner bearing part is designed as an inner bearing shell designed in socket form, and
(d) the inlays are spring-elastic.

In a tie rod joint designed according to this technical instruction, the idea of the invention consists of the fact that the tie rods, engaging by their offsets, form-fitting in a joint housing formed of an outer and an inner bearing shell, with the use of spring-elastic inlays, spring back against the two bearing shells and prestress the spring joint formed in this way with a bolt passing through the construction parts, which at the same time, produces the connection with the steering rod. All the individual parts of such a tie rod joint can be produced without cutting. The tie rods, with their offsets, may be made from a steel plate or from a plastic reinforced with fiberglass. The two bearing shells are simple construction parts which can be formed from steel plate, and can be used without finishing by cutting. The outer and inner spring-elastic inlays are suitably made from a spring-elastic rubber or from a thermoplastic, and space the bearing parts from each other. The joint deflections occurring in driving operation are so slight that no slippage must be possible between the joint parts. For this reason, the spring-elastic inlays might be joined solidly with their bearing shells even in the premounting. The tie rod joint designed according to the invention as a spring joint, is absolutely maintenance-free and has an extraordinarily long life. With this, the invention makes an extraordinary contribution to safety in road traffic.

In one pratical form of execution, with only one tension bolt, the outer bearing shell may have a circular outline and receive an outer inlay, designed in ring form. The inner inlays are semi-shell form and separated from each other, so that they will not be crushed between the edges on the offsets of the tie rods. The inner bearing shell may, in this first form of execution, consist of a simple tubular socket and a tension disc. In this tie rod joint, the turning point lies in the middle of the vehicle, so that the tie rods have an optimum length to keep the track changes as small as possible in springing in and out.

In another practical form of execution, with two tension bolts, the outer hearing shell has suitably an oval outline and the outer and inner inlays are designed in semi-shell form in each case. Also, with this form of execution, the inner bearing shell may consist of two tubular sockets, which are then joined together with a common tension plate. In further development of this form of execution, it is possible, as additional security, to fasten the tension plate by side flanges to one of the outer bearing shells between the two bolts passing through the spring joint, when the spring joints are prestressed.

To improve the connection of the spring joint or joints with the steering rod, it has proved desirable to space the outer bearing shell from the steering rod by means of one or two bearing bushings, which at the same time surround the tension bolt or bolts.

Other details and advantages of the subject of the invention are given from the description which follows of the respective drawings, in which are shown schematically two different forms of execution of a tie rod joint designed according to the invention. In the drawings.

Figure 7:
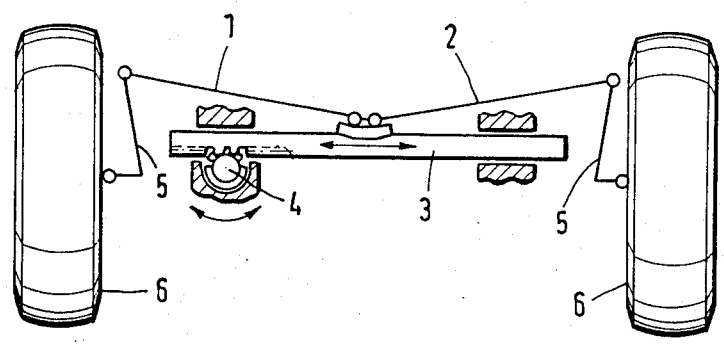
FIG. 7 shows the scheme of a rack steering gear with decrease in the middle, in top view.

In the case of a rack steering with decrease in middle, as shown schematically in FIG. 7, the inner ends of tie rods 1, 2 are linked to a steering rod 3, which is connected through a gear 4 with the steering wheel of the motor vehicle. The outer ends of the two tie rods 1, 2 are connected through links 5 with wheels 6, which in this way, through a movement of the steering rod 3 to one or the other side, can be turned from straight travel into curved travel.

Figure 1:
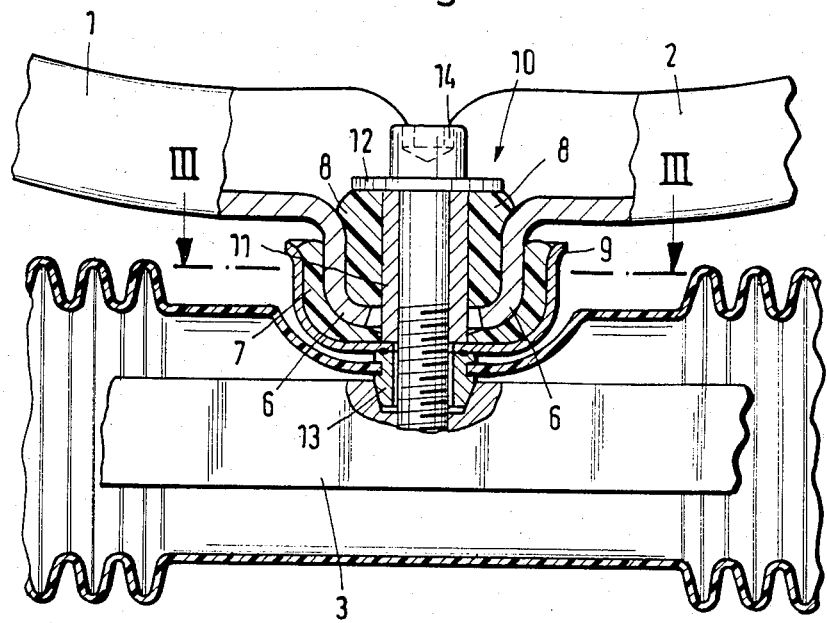
FIG. 1 shows a tie rod joint with only one tension bolt, taken along the line I—I in FIG. 2, in side view.
Figure 2:
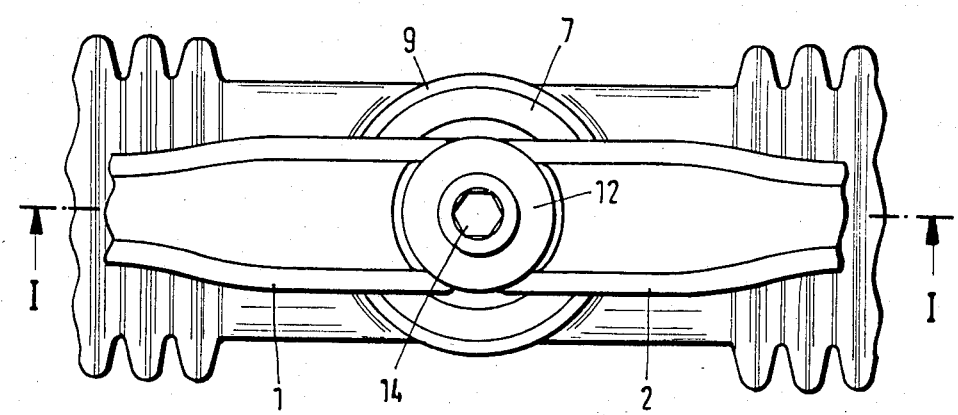
FIG. 2 shows the same tie rod joint according to FIG. 1, in top view.
Figure 3:
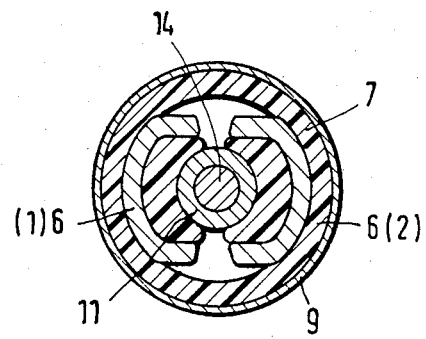
FIG. 3 shows the same tie rod joint taken along the line III—III in FIG. 1.

In the tie rod gear shown in FIGS. 1 to 3, the two tie rods 1, 2 have a U-shaped profile and are provided at their inner ends with offsets, of which the stay at the end is cut out in semicircular form. By their offsets 6, the two tie rods 1, 2, with interposition of a spring-elastic outer inlay 7 and two spring-elastic inner inlays 8, project in a joint housing, which is formed by an outer bearing shell 9 and an inner bearing shell 10.

The outer bearing shell 9 has a circular outline (FIG. 3) and receives the ring-shaped outer inlay 7, which may be solidly joined with it. In the bottom, the outer inlay 7 has a circular opening. The inner bearing shell 10 comprises a tubular socket 11, which is supported by its lower end on the outer bearing shell 9, and a tension disc 12. Between the steering rod 3 and the outer bearing shell 9 is disposed a bearing bushing 13, which has an axial bore. Its groove on the outer diameter guides a collar of the steering gear.

The spring joint, consisting of the outer bearing shell 9, the inlays 7, 8 with the offsets 6 of the tie rods 1 and 2, lying between them, as well as the inner bearing shell, is prestressed by a tension bolt 14, passing axially through its construction parts, which at the same time is fastened by threading into the steering rod 3. With this, the prestress of the spring joint is limited by the length of the socket 11.

Figure 6:
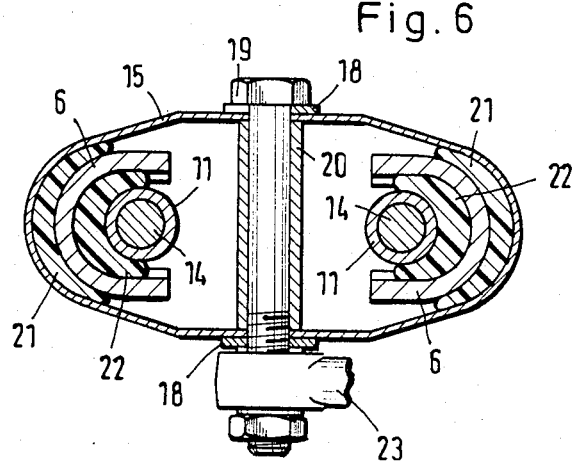
FIG. 6 shows the same tie rod joint along the line VI—VI in FIG. 4.
Figure 4:
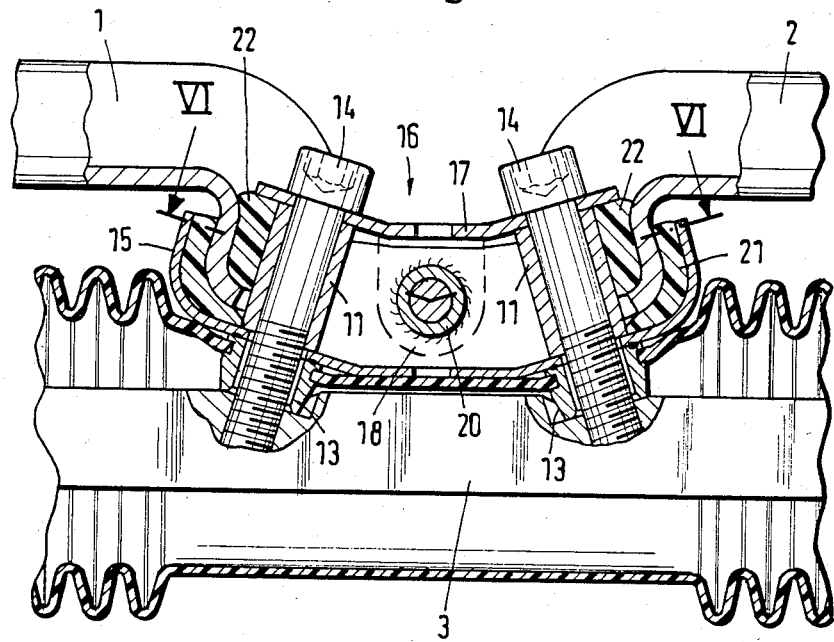
FIG. 4 shows a tie rod joint with two tension bolts, taken along the live V—V in FIG. 5, in side view.
Figure 5:
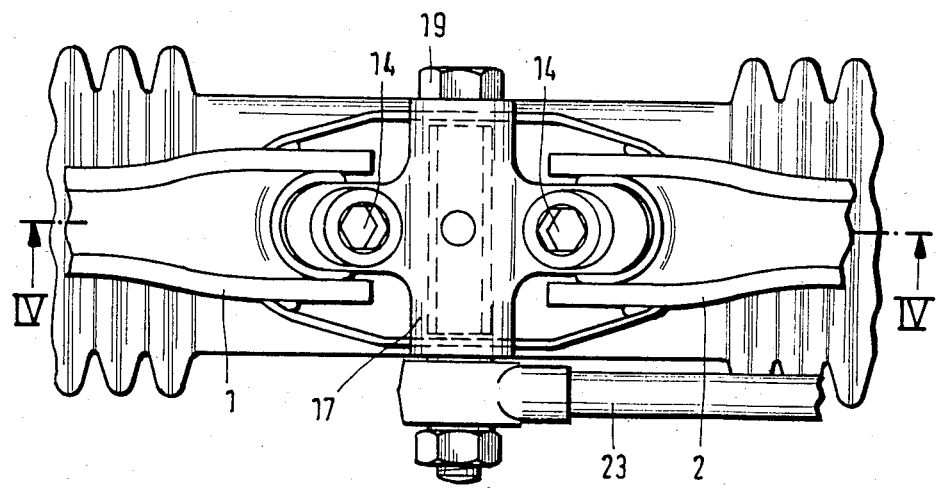
FIG. 5 shows the same tie rod joint in top view.

The tie rod joint with two tension bolts 14, shown in FIGS. 4 to 6, has an outer bearing shell 15 with oval outline, and an inner bearing shell 16, which comprises two sockets 11 and a tension plate 17 joining these together. The tension plate 17 has flanges 18 formed at the side and angled, which are provided with openings. In this way it is possible to join the outer bearing shell 15 and the tension plate 17, in the prestressed condition of the spring joint, with a bolt 19, on which is arranged, within the bearing shell 15, a distancing socket 20.

With this form of execution of the tie rod joint, two outer inlays 21, separated from each other, are provided, which are designed in half shell form. The two inner inlays 22 are also separated from each other and designed in half shell form. Otherwise, this spring joint with two tension bolts 14 is mounted and prestressed in the same way as the form of exection described before, with only one tension bolt 14. With the two tension bolts 14, a better connection with the steering rod 3 can be produced.

On the bolt 19, there can be supported at the same time a piston rod 23 of a steering shock absorber.

What is claimed is:

1. A tie rod joint motor vehicles for linking spaced inner ends of two tie rods to a steering rod actuated by a steering gear, said joint comprising:
    outer and inner bearing parts between which the spaced inner ends of the tie rods project,
    first resilient inlay means located between said outer bearing part and said spaced inner ends of said tie rods and second resilient inlay means located between said inner bearing part and said spaced inner ends of said tie rods,
    a tension bolt arrangement including at least one tension bolt for fastening to the steering rod and prestressing said resilient inlay means,
    said tie rods being U-shaped in cross section and having a main portin with the respective inner ends thereof offset from said main portion,
    said outer bearing part being cup-shaped, said offset inner ends projecting into said cup-shaped outer bearing part, and
    said inner bearing part comprising at least one socket for receiving said one tension bolt.

2. A tie rod joint according to claim 1 wherein said outer bearing part has a circular outline, said first resilient means is a ring-shaped shell, said second resilient inlay means comprising two circular half shells, and said tension bolt arrangement includes a tension disc engaging said inner bearing part.

3. A tie rod joint according to claim 2 further including a bearing bushing located between said steering rod and said outer bearing part.

4. A tie rod joint according to claim 1 wherein said outer bearing part has an oval cross section, said first and second inlay means each comprises two oval-shaped half shells, said inner bearing part comprising two sockets, and said tension bolt arrangement comprises a common tension plate overlying said two sockets.

5. A tie rod according to claim 4 wherein said tension plate has side flanges for receiving a bolt passing through the middle of said outer bearing part.

6. A tie rod joint according to claim 5 further including two bearing bushings spacing said outer bearing part from said steering rod.

7. Tie rod joint according to claim 1 wherein said tie rods are made of steel or plastic reinforced with fiberglass.

8. A tie rod joint according to claim 1 wherein said first and second resilient inlay means are formed of rubber or a thermoplastic plastic.

9. A tie rod joint according to claim 1 wherein said first and second inlays are solidly joined with said outer and said inner bearing parts, respectively.

10. A tie rod joint according to claim 1 wherein said inner bearing part is supported, in said prestressed condition of the joint, on the outer bearing part.

* * * * *